(12) United States Patent
Herold et al.

(10) Patent No.: US 7,018,035 B1
(45) Date of Patent: Mar. 28, 2006

(54) FLIP-UP EYEWEAR

(75) Inventors: Jeffrey C. Herold, Huntington Beach, CA (US); Hiroyuki Sasaki, Sabae (JP)

(73) Assignee: West Coast Trends, Inc., Huntington Beach, CA (US)

( * ) Notice: Subject to any disclaimer, the term of this patent is extended or adjusted under 35 U.S.C. 154(b) by 0 days.

(21) Appl. No.: 09/690,360

(22) Filed: Oct. 16, 2000

(51) Int. Cl.
*G02C 1/00* (2006.01)

(52) U.S. Cl. ............................ 351/60; 351/47; 351/48; 351/103

(58) Field of Classification Search ................. 351/41, 351/44, 47, 48, 57–59, 103–109, 158, 60
See application file for complete search history.

(56) References Cited

U.S. PATENT DOCUMENTS

| | | | |
|---|---|---|---|
| 4,196,981 A * | 4/1980 | Waldrop | 351/59 |
| D294,950 S | 3/1988 | Shelton et al. | |
| D337,124 S | 7/1993 | Hall | |
| 5,243,366 A * | 9/1993 | Blevins | 351/57 |
| 5,642,177 A | 6/1997 | Nishioka | |
| 5,719,655 A | 2/1998 | Peschel et al. | |
| 5,975,691 A | 11/1999 | Ku | |
| 6,053,611 A | 4/2000 | Ku | |
| 6,695,448 B1 * | 2/2004 | Xiao | 351/57 |
| 2002/0093622 A1 * | 7/2002 | Tostado | 351/57 |

* cited by examiner

*Primary Examiner*—Huy Mai
(74) *Attorney, Agent, or Firm*—Thelen Reid & Priest LLP

(57) ABSTRACT

Eyewear characterized as flip-up sunglasses include a combination of a spring loaded hinge and a magnetic seat. The spring loaded hinge relieves a user the task of properly placing a flip-up portion in a holding mechanism. In combination with the spring, the magnetic seat allows the flip-up lenses to be held against the spring force and provides a simple release action which may be quickly accomplished by merely breaking a magnetic contact bond. As such, the action of flipping up and flipping down a sunglasses lens or lenses becomes comfortable and simple. The glasses are particularly useful for users who frequently switch between looking into shadows and lighted areas which would otherwise require removing sunglasses and replacing them.

10 Claims, 7 Drawing Sheets

FLIP-UP EYEWEAR

BACKGROUND OF THE INVENTION

1. Field

The field of the inventions described hereinfollowing may best be characterized as eyewear for protection of eyes from the sun and more specifically eyewear having high quality lenses with a flip-up feature.

2. Prior Art

Eyewear design, and in particular sunglasses type eyewear, receives considerable attention with regard to improvements and perfection. This may be due to the sensitive nature of human vision and strong need for clear vision in performance of daily activity including sports.

Even casual observers will recall a great plurality of sunglasses types each being configured with various function in mind. One type of sunglasses made particularly popular by professional athletes includes those commonly and herein known as 'flip-up' type sunglasses. A flip-up sunglasses may typically have darken lenses in a frame which pivots from a first position in front of a user's eyes to a second position which leaves the eyes with a view clear of the lenses. These are very popular with baseball players who are often charged with having to look into shadows at one instant while having to look into direct sunlight at another. Without entirely removing sunglasses from ones face, a player can quickly 'flip' lenses into or out of a view path in agreement with particular view conditions.

In some versions, flip-up sunglasses are arranged to be coupled to and cooperate with conventional eyeglasses having optically powered lenses. For example, inventor Russel T. Hall puts forth a design of flip-up sunglasses which have a clip on mechanism which couples the sunglasses to normal eyeglasses. There are many alternative versions in the art; some with particularly interesting features are described below. Indeed most systems are arranged as sunglasses made to cooperate with conventional eyeglasses.

However, it is important to note that a completely different class of removable sunglasses exists where there is no powered optical lenses. Rather, there is a darkened lens or lens set which may be easily moved out of the user's view path to leave only clear space between a user's eyes and the scene being viewed. One type of such system is illustrated by very novel design and invention taught in U.S. Pat. No. 5,719,655 assigned to Nike, Inc. of Beaverton, Oreg. A lens held by a frame without traditional temples is arranged with complementary magnetic element pairs which may be fastened to a user's head via adhesives. To remove the sunglasses for a clear view, a user simply breaks the magnetic bond between magnet pairs.

Another feature of flip-up sunglasses important to users of such devices is aesthetic appearance with regard to concealing hinging apparatus. Hinges which are readily visible tend to make glasses look bulky and clumsy. Accordingly, it is important to provide functional designs which respect desirable aesthetic properties of eyewear in commercial versions of sunglasses. The patented design of Shelton et al for "Eyeglasses With Flip-Up Lenses" presented as U.S. Pat. No. D294,950 shows one particularly neat way of combining a hinge with a glasses frame.

Where sunglasses lenses are to be combined with corrective eyeglasses, addition inventive arrangements and designs have been advanced. Of particular interest, "A Detachable Sunglasses with Magnets" is presented in U.S. Pat. No. 5,642,177 assigned to Sunreeve Company of Japan. These glasses include a sunglasses type lens set which may be coupled to a conventional corrective lens set via magnetic elements. When it is desirable to wear corrective lenses without darkened lenses, the sunglasses portion is removed, folded and placed in a convenient case. Although the sunglasses portion is provided a foldable mechanism, this arrangement is not easily used in sporting events which require one to switch the sunglasses quickly and repeatedly in a short period of time. In addition, since the sunglasses portion is totally removable from its mate, there is potential for complete separation and inadvertent loss.

A similar and very clever design which utilizes magnets is illustrated by U.S. Pat. No. 6,053,611. Again, sunglasses lenses are removable from corrective lenses. While in place, the sunglasses lenses are held by magnetic forces provided by magnets in the bridge portion of the convention glasses frames.

A second and similar invention taught by the same teacher Mr. Ku of Taiwan is presented as U.S. Pat. No. 5,975,691. This arrangement includes magnetic elements on hinged pieces which allow magnets to become better aligned and coupled with one another. In this manner, preferred coupling is achieved between the removable sunglasses element and the primary eyewear frame.

Finally, an interesting arrangement of a flip-up sunglasses with a magnetic element is presented as the invention of U.S. Pat. No. 4,196,981 granted Apr. 8, 1980. In this arrangement of sunglasses without corrective lenses, a magnetic element is configured as the core of a two part hinge. The second portion of the two part hinge is made of ferrous material which is highly affected by magnetic fields produced by the magnet. Although the arrangement is a curious one, it remains one without explanation as to how the magnetic arrangement tends to operate to cause the outcome desired. Experts in magnetics may challenge the notion that the magnetic arrangement tends to hold the lens frame in either of its two terminal positions or in any position therebetween.

In general, flip-up lenses of the art tend to suffer additional problems. Typically, a flip-up lens arrangement relies on a plurality of détentes arranged in conjunction with a hinge to hold a lens or lenses in a flipped-up position and sometimes in a down position. With arrangements like these, a user has to push the lens past the détente and into a position where the lens to be held.

In other versions, a mechanical interlocking clip is used to hold a flip-up lens to a conventional pair of corrective eyeglasses. These clips are sometimes difficult to operate in particular they may be difficult to release as they tend to be quite small and fragile.

Notwithstanding, very novel apparatus have been discovered which may be characterized as eyewear, particularly to flip-up sunglasses having a magnetic seating feature. While the systems and inventions of the art are designed to achieve particular goals and objectives, some of those being no less than remarkable, these inventions have limitations which prevent their use in new ways now possible. These inventions of the art are not used and cannot be used to realize the advantages and objectives of the present invention.

SUMMARY OF THE INVENTION

Comes now, Jeffrey C. Herold, Brian Tostado, and Satoshi Haneda with inventions of sunglasses type eyewear including devices having a spring loaded flip-up tinted lens portion with a magnetic holding mechanism.

Apparatus of the present inventions include a frame fashioned as eyewear with conventional temple elements and a nose bridge. However, optically corrective lenses may be omitted. A flip-up portion including tinted lenses is arranged and coupled to the frame in a special manner. The coupling includes a spring loaded hinge whereby the spring applies a force to the flip-up portion motivating it to rotate to a flipped-up position. In addition, the coupling includes a magnetic seating means. When the flip-up portion is pushed into a down position, magnets on the frame and flip-up portions make contact and cause the flip-up portion to remain seated in the down position. A user only has to break the contact between magnets to release the flip-up portion. This allows one to apply slight pressure anywhere on the flip-up member to cause it to release and advance to a flipped-up position. The combination of a spring loaded element with a magnetic seat in flip-up eyewear is unique and described in detail herefollowing.

OBJECTIVES OF THE INVENTION

It is a primary object of the invention to provide novel eyewear having high performance flip-up features.

It is an object of the invention to provide sunglasses eyewear having a magnetic seat.

It is an object of the invention to provide flip-up eyewear with a spring loaded hinge and a magnetic seat.

A better understanding can be had with reference to detailed description of preferred embodiments and with reference to appended drawings. Embodiments presented are particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

PREFERRED EMBODIMENTS OF THE INVENTION

In accordance with each of the preferred embodiments of the invention, there is provided sunglasses eyewear apparatus having a flip-up feature with a magnetic seat. It will be appreciated that each of the embodiments described may include an apparatus that an apparatus of one preferred embodiment may be different than an apparatus of another embodiment.

Apparatus of the inventions are primarily comprised of two major portions. A first portion is herein known as a 'frame' member. A second portion is herein known as a 'flip-up' member. The frame member is connected to and coupled with the flip-up member by way of a hinge or hinges whereby the flip-up member may be moved from the frame member in a rotational sense. In preferred versions, the hinge is loaded with a spring which applies a force on the flip-up member which encourages it to rotate into a 'flipped-up' position or an up terminal position. To maintain the flip-up member in a down terminal position, a mechanism is arranged to work against the spring forces. A magnet or magnets is/are provided to hold the flip-up member to the frame while the flip-up member is in partial contact with the frame member. When contact is broken, even by a small amount, the flip-up portion moves under influence of the spring to an up terminal position and is held there out of the user's optical view path.

Figure 1:
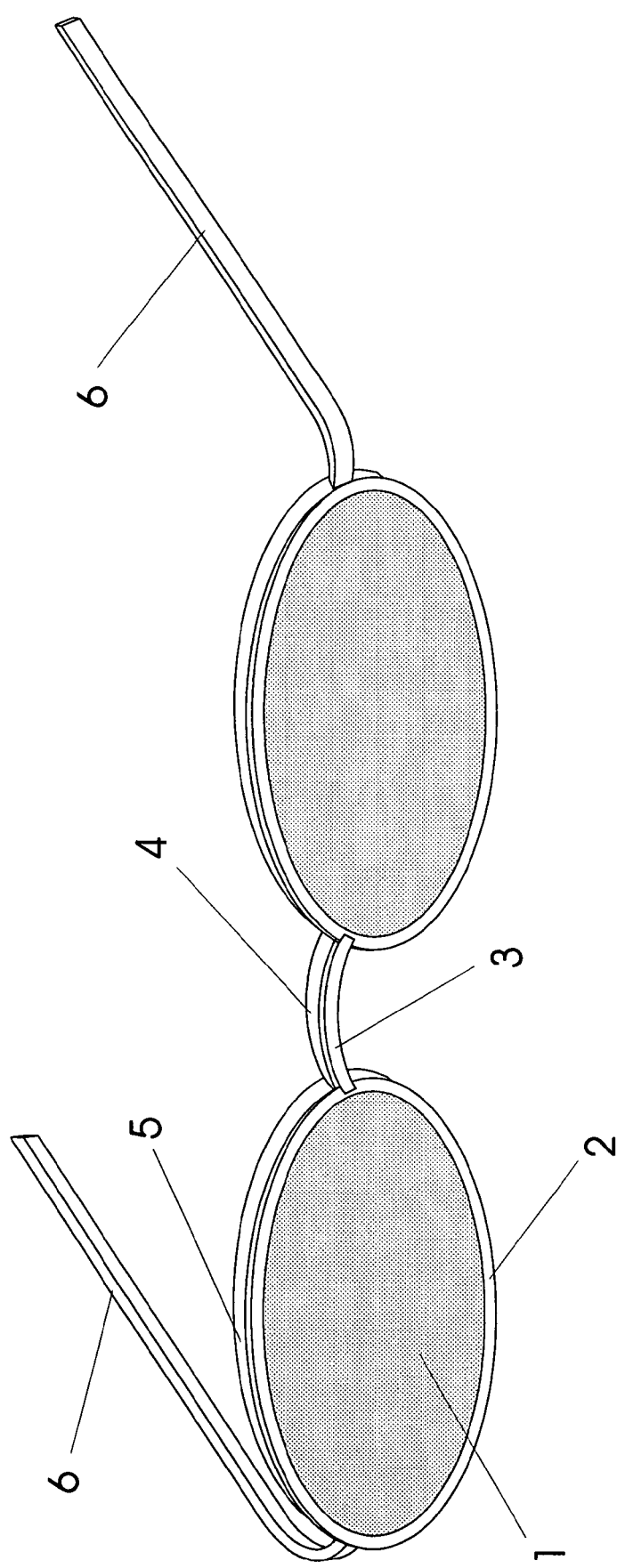
FIG. 1 is a perspective view of the eyewear of the inventions with the flip-up member in the down terminal position.

The inventions will be better understood with reference to the drawings and in particular to FIG. 1 which illustrates a perspective view of eyewear of the inventions. A flip-up member is comprised of a shaded lens 1 contained and held within a lens periphery support 2 which is constructed of metallic material. An identical lens and support is connected to the first by way of a bridge element 3. A frame member is comprised of a similar bridge 4, cross elements 5, and temple elements 6. The flip-up member is shown in the drawing is a down terminal position and closely coupled to the frame member. Because the profiles of the flip-up member and frame member are quite similar, it is difficult to perceive the apparatus as being two discrete members and will appear to be only one. This is particularly true in a front-on view.

Figure 2:
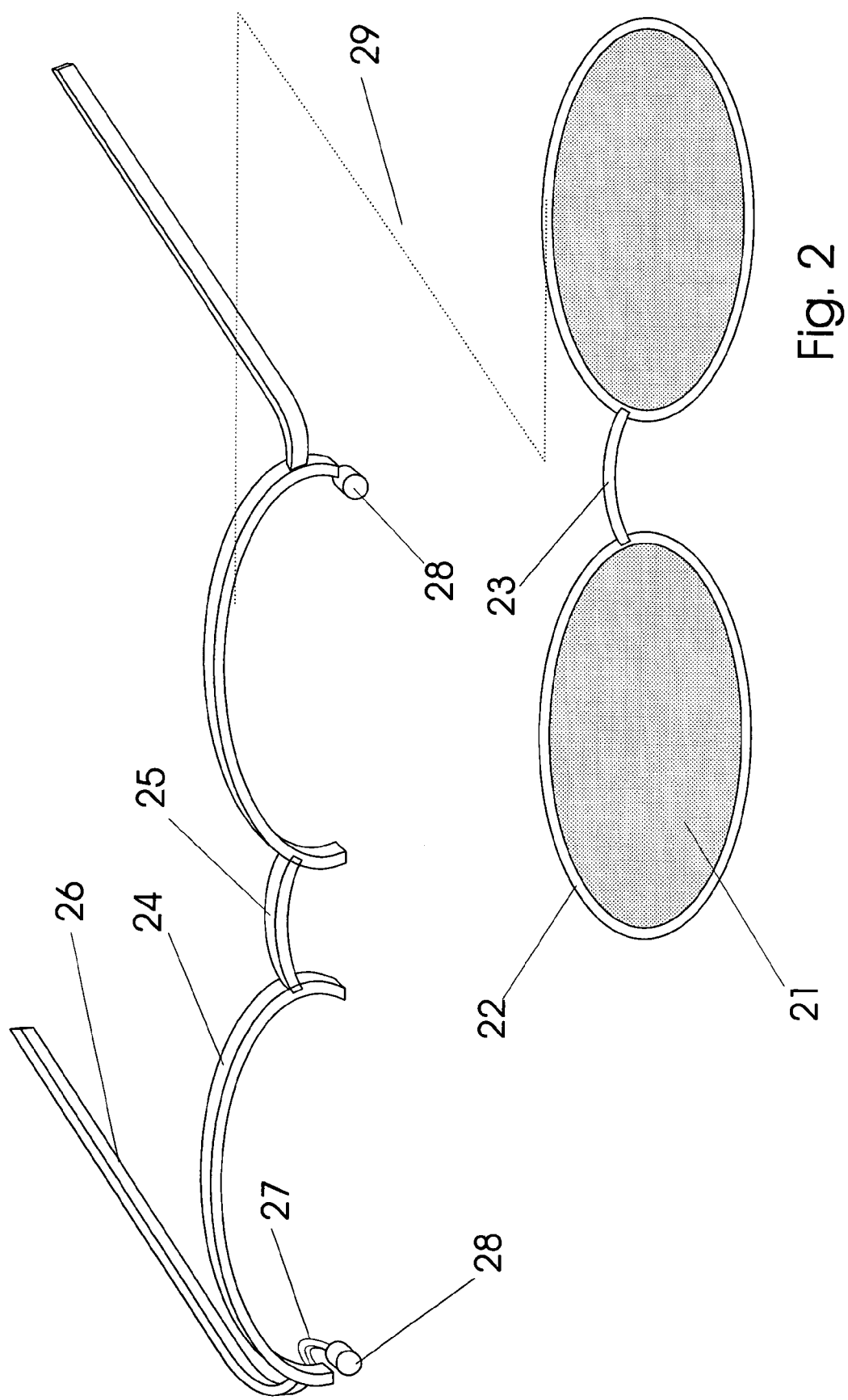
FIG. 2 is an exploded view of the two major members of apparatus of the inventions.

FIG. 2, an exploded view is provided to show more clearly the two major portions of apparatus of the inventions. A darkened lens 21 is held within a lens periphery support 22 and held by way of a bridge 23 to a matching lens and support to form a flip-up member. A frame member includes a bridge curved cross element 24 supported by and connected to a similar cross element by a bridge element 25. Both cross members have connected thereto temple elements 26 in a fashion known in the art. cross elements further have a mechanical adjustment means 27, for example a bendable wire, which holds a magnet or magnet housing 28. When a flip-up member and a frame member are coupled together, they are coupled at a rotation axis whereby the flip-up member moves in relation to the frame member via a rotational relationship.

Figure 3:
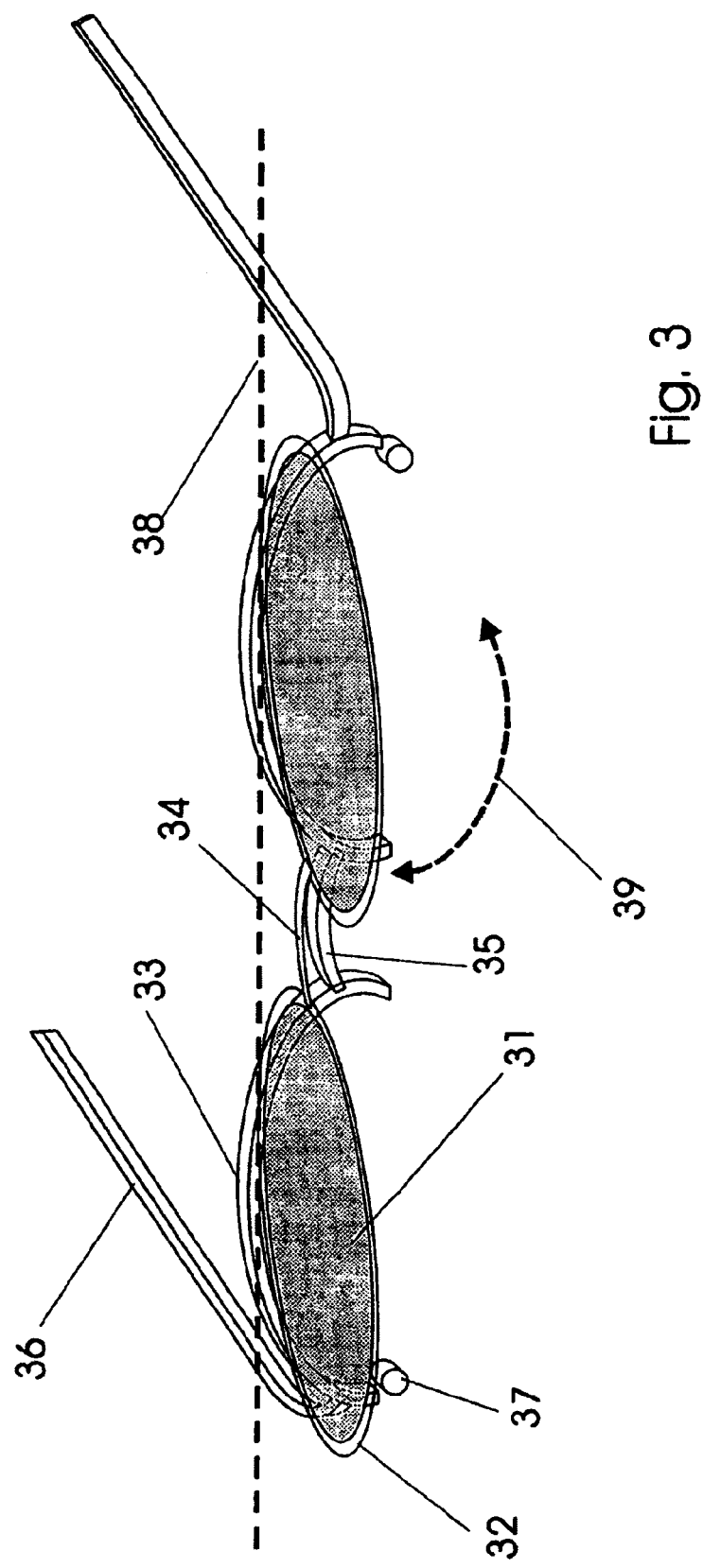
FIG. 3 illustrates operational motion of a flip-up element.

FIG. 3 illustrates rotational motion of a flip-up member coupled to a frame member about a rotational axis. Sunglasses lens 31 held in support 32 is rotatably coupled to frame cross element 33. Careful examination of the figure shows that the bridge 34 of the flip-up member moves away from the bridge 35 of the frame member as the flip-up member is rotated upwardly towards an up terminal position. Temples 36 and magnet 37 are part of the frame and do not move while the flip-up member is rotated about axis 38 whereby the bottom of the lens support traces out an arc 39. Thus, FIG. 3 illustrates a flip-up member making a transition from a down terminal position to an up terminal position; the flip-up member shown between those positions.

Figure 4:
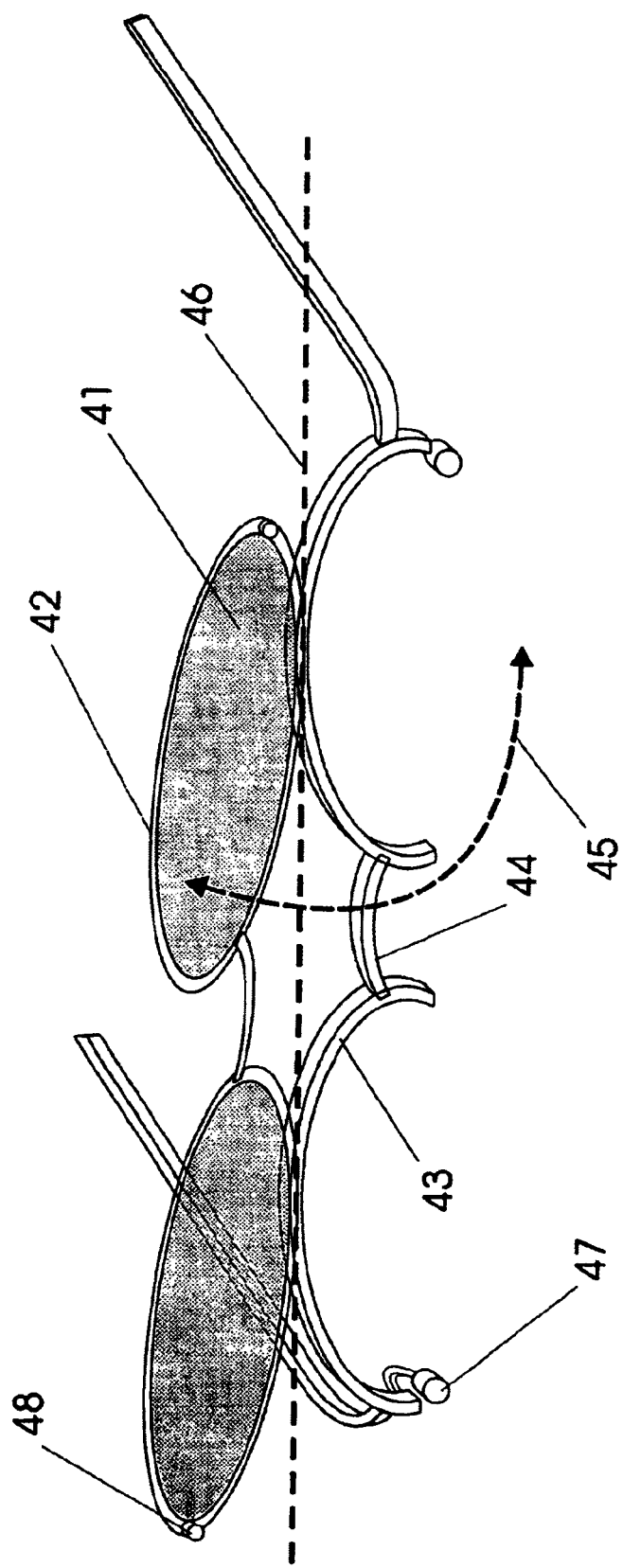
FIG. 4 shows a flip-up member in an up terminal position.

To complete the illustration of a flip-up operation, FIG. 4 is provided. Lens 41 and lens support 42 of flip-up member are shown in a full 'up' position or an up terminal position. Frame cross element 43 and frame bridge element 44 remain fixed in position while flip-up member rotates through arc indicated by arrow 45 about the rotation axis indicated by dotted line 46. Complementary magnet pairs 47 and 48 align with one another when the flip-up member is in a down terminal position to form a strong magnetic bond.

Figure 5:
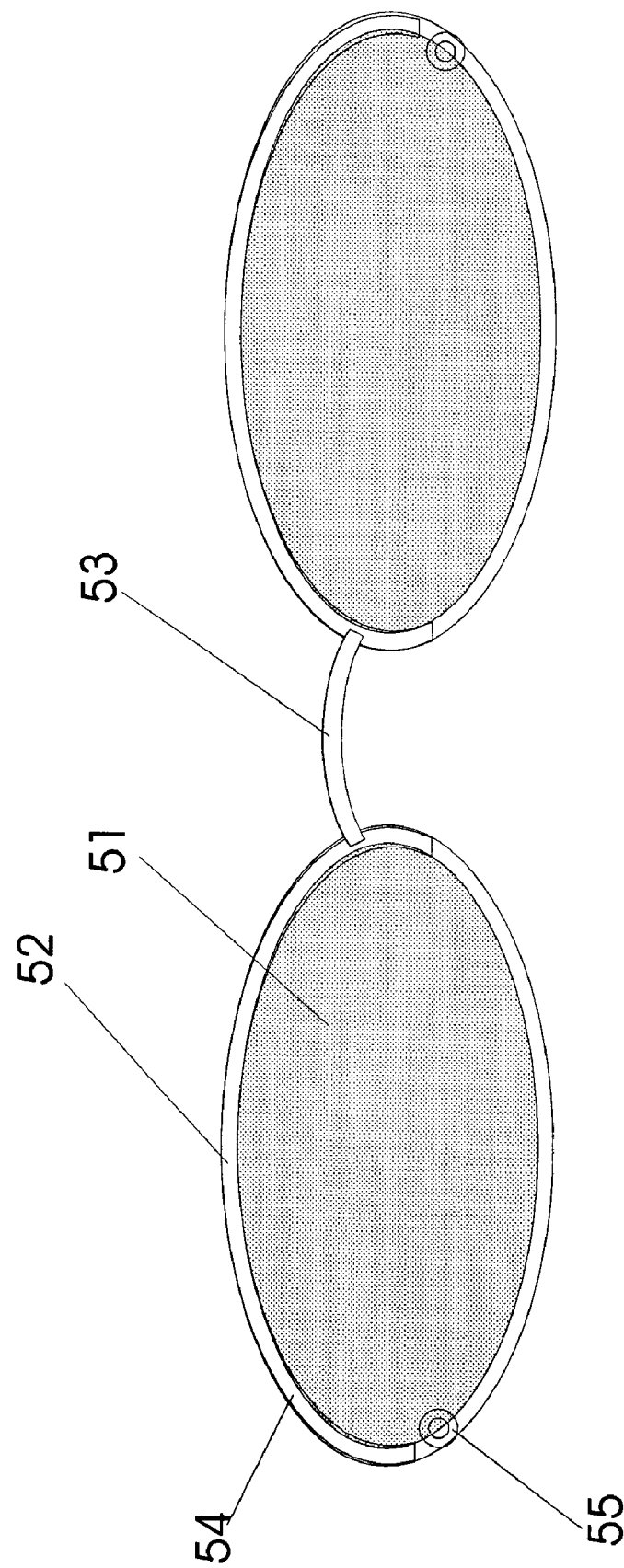
FIG. 5 is a straight on front view to illustrate a well hidden frame member.

One important aspect of the invention is to provide eyewear which is attractive in appearance. Accordingly, it is useful to hide elements of the frame and flip-up members or to make them appear as a single piece. This can be more readily appreciated from a straight on view shown in FIG. 5. Lens 51 and support 52 entirely hide the frame member which sets behind the flip-up member. It is easy to see that the bridge 53 of the flip-up member and the bridge of the frame member appear as a single bridge. Similarly, the lens peripheral support element 52 is shaped in a fashion to cooperate with the frame cross member 54 whereby it is completely covered in a front-on view as the frame lies behind the flip-up member while it is in a down terminal position, i.e. a seated position. Magnets, magnets sets, or magnets pairs 55 are also positioned where they cannot be seen behind the lenses.

Figure 6:
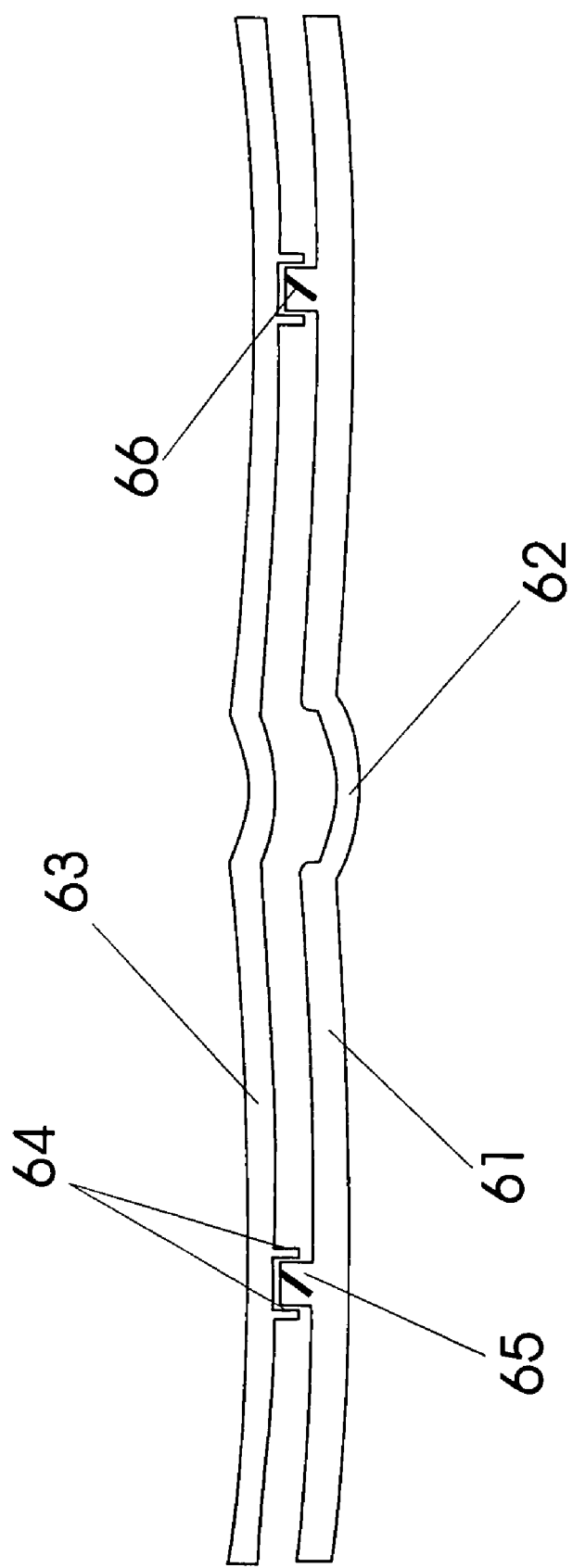
FIG. 6 is a top-down view of a frame member coupled to a flip-up member via hinges.

A top-down view of FIG. 6 shows an important relationship of the coupling between a flip-up member and a frame member. The flip-up member lens support 61 is shown connected to the flip-up member bridge 62. The top portion of the frame member cross element 63 includes specially arranged receiving tabs 64. Lens support element 61 also includes cylinder 65 which together with a pin (not shown), and receiving tabs 64 forms a hinge which links the flip-up member to the frame member. A spring steel wire 66 may be wound about the hinge pin and attached to the lens support and cross elements to form a spring loaded hinge.

Figure 7:
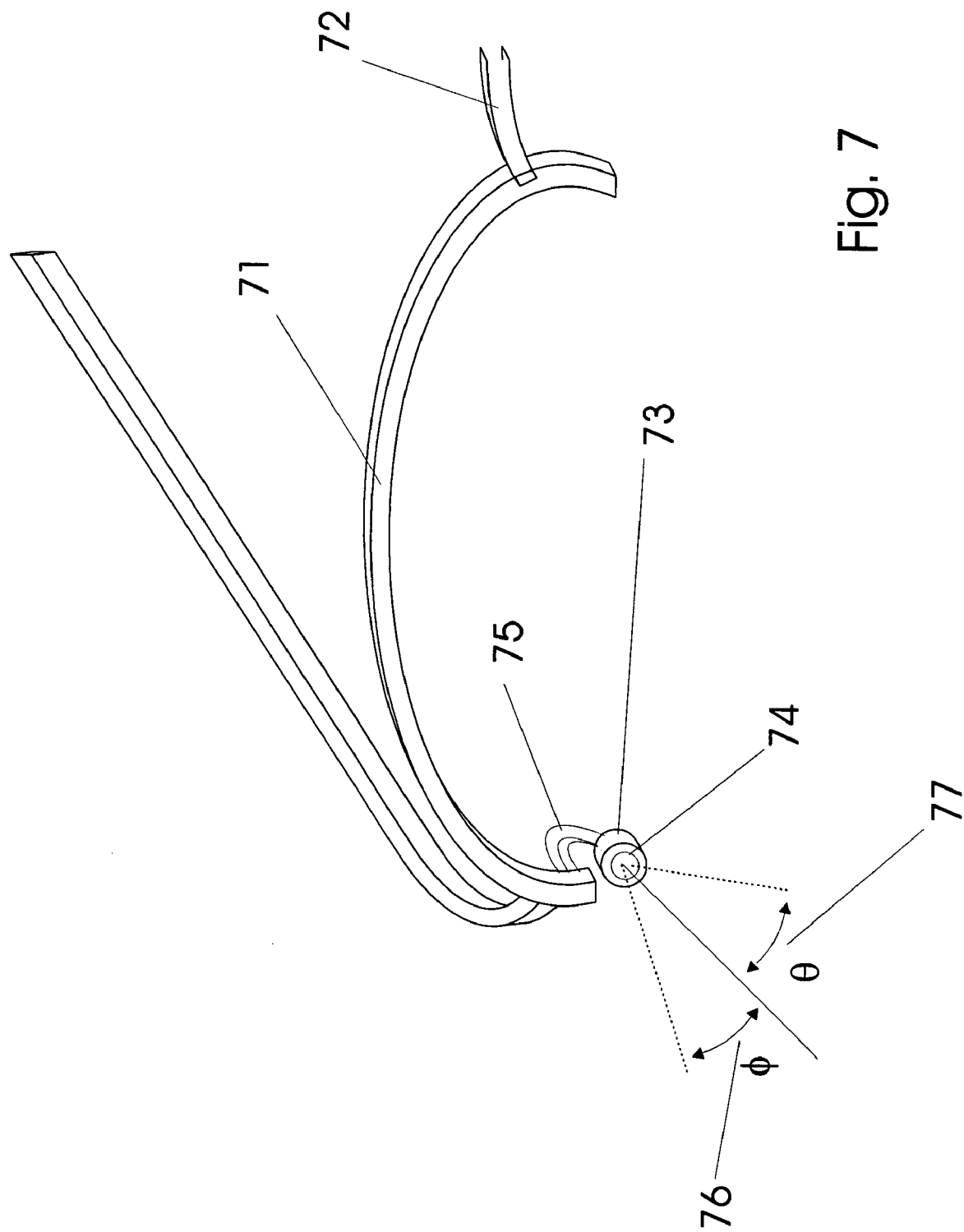
FIG. 7 is a close-up view of an adjustable magnet element.

Finally, FIG. 7 is presented to show the adjustable nature of magnets which may be used in conjunction with either the frame element or the flip-up element or both. A frame member is shown with cross element 71, bridge 72, a magnet encasing 73 which holds therein via adhesive a magnet 74. Metal wire 75 connects magnet encasing to the outside end of the cross element. By applying pressure to the wire with ones fingers or an optical tool such as pliers, the magnet position becomes easily adjustable. The flat face of the magnet can be moved in orthogonal directions to cause the face to traverse an angle $\theta$, 77 or $\phi$, 76 as shown.

The examples above are directed to specific embodiments which illustrate preferred versions of devices and methods of the invention. In the interests of completeness, a more general description of devices and the elements of which they are comprised as well as methods and the steps of which they are comprised is presented hereinfollowing.

One will now fully appreciate how sunglasses type eyewear having a spring loaded hinge and magnetic seat make a useful and valuable apparatus. Although the present invention has been described in considerable detail with clear and concise language and with reference to certain preferred versions thereof including the best mode anticipated by the inventor, other versions are possible. Therefore, the spirit and scope of the invention should not be limited by the description of the preferred versions contained therein, but rather by the claims appended hereto.

What is claimed is:

1. Apparatus arranged as eyewear comprising a flip-up member coupled to a frame member about a pivot axis whereby said flip-up member freely rotates from an up terminal position to a down terminal position, said flip-up member being held in the down terminal position to said frame member by magnetic forces.

2. Apparatus of claim 1, said flip-up member having sunglasses tinted lenses and said frame member without lenses.

3. Apparatus of claim 2, comprising a hinge coupling between said frame member and said flip-up member, said hinge coupling being mechanically loaded by a spring.

4. Apparatus of claim 3, said spring being arranged and biased to advance the flip-up member towards the up terminal position.

5. Apparatus of claim 4, said frame member being further comprised of at least one magnet element arranged to hold said flip-up member against the force of the spring.

6. Apparatus of claim 4, said flip-up member being further comprised of at least one magnet element arranged to hold said flip-up member against the force of the spring.

7. Apparatus of claim 4, said frame member being further comprised of at least one magnet element and said flip-up member being further comprised of at least one magnet element, said magnets being arranged to hold said flip-up member against the force of the spring.

8. Apparatus of claim 5, said at least one magnet being arranged on an adjustable mechanism whereby its position may be easily altered to better couple with the flip-up member or magnets thereon.

9. Apparatus of claim 8, said adjustable mechanism is a metallic wire arrangement which couples said magnet to said frame member.

10. Apparatus of claim 1, said frame member comprising two cross elements, two temple elements, a bridge element having two ends, and a pair of magnet elements, the two temple elements being connected to either of the two cross elements, the bridge element being connected on either end to the two cross elements, the cross elements being curved about the perimeter of an optical view path, one magnet each being affixed to an outside portion of either cross element; and said flip-up member comprising a two shaded lenses, two metallic lens periphery supports, a bridge element having two ends, and a pair of magnet elements, the metallic lens periphery supports each being connected to either end of said bridge element, said pair of magnets being affixed to said metallic lens periphery supports in a position corresponding to those magnets affixed to frame member cross elements whereby when the flip-up member is pushed to the frame member the magnets align and contact to hold the flip-up member against forces of a spring.

\* \* \* \* \*